United States Patent
Hoβbach et al.

(10) Patent No.: US 10,605,118 B2
(45) Date of Patent: Mar. 31, 2020

(54) TURBOCHARGER

(71) Applicant: MAN DIESEL & TURBO SE, Augsburg (DE)

(72) Inventors: Björn Hoβbach, Diedorf (DE); Santiago Uhlenbrock, Graefenberg (DE); David Jerábek, Osová Bitýska (CZ); Lukás Bozek, Pribyslavice (CZ); Stefan Rost, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 123 days.

(21) Appl. No.: 15/923,790

(22) Filed: Mar. 16, 2018

(65) Prior Publication Data
US 2018/0266273 A1 Sep. 20, 2018

(30) Foreign Application Priority Data
Mar. 17, 2017 (DE) .................. 10 2017 105 756

(51) Int. Cl.
*F01D 25/14* (2006.01)
*F01D 25/12* (2006.01)
(Continued)

(52) U.S. Cl.
CPC ............ *F01D 25/14* (2013.01); *F01D 5/043* (2013.01); *F01D 9/026* (2013.01); *F01D 25/12* (2013.01); *F01D 25/24* (2013.01); *F02B 39/005* (2013.01); *F02C 6/12* (2013.01); *F02C 7/12* (2013.01); *F02C 7/141* (2013.01); *F04D 25/024* (2013.01);
(Continued)

(58) Field of Classification Search
CPC ........ F01D 5/043; F01D 9/026; F01D 25/162; F01D 25/24; F04D 25/024; F04D 29/4226; F02C 6/12; F02C 7/12; F02C 7/141; F02B 39/005; F02B 2039/164; F05D 2220/40; F05D 2240/14; F05D 2260/20
See application file for complete search history.

(56) References Cited

U.S. PATENT DOCUMENTS 2,866,617 A * 12/1958 Land .................. F01D 25/14
                                                    417/406
3,948,052 A * 4/1976 Merkle ................. F01N 3/046
                                                    60/605.1
(Continued)

FOREIGN PATENT DOCUMENTS

DE 10 2010 038 909 A1 2/2012
JP 2015 001183 A 1/2015

*Primary Examiner* — Igor Kershteyn
(74) *Attorney, Agent, or Firm* — Cozen O'Conner

(57) ABSTRACT

A turbocharger has a turbine for expanding a first medium and a compressor for compressing a second medium utilizing energy extracted in the turbine. The turbine includes a housing with a turbine inflow housing and a turbine rotor. The compressor has a compressor housing and a compressor rotor coupled to the turbine rotor via a shaft. The turbine inflow housing is constructed in a spiral-like, one-piece and double-walled manner such that between an outer wall of the turbine inflow housing and an inner wall of the turbine inflow housing a water duct for conducting cooling water is formed. The inner wall delimiting the water duct on a side of the inner wall facing away from the water duct is directly followed by a guide duct of the first medium to be expanded.

8 Claims, 3 Drawing Sheets

(51) Int. Cl.
*F01D 25/24* (2006.01)
*F01D 5/04* (2006.01)
*F02C 6/12* (2006.01)
*F02C 7/141* (2006.01)
*F02C 7/12* (2006.01)
*F01D 9/02* (2006.01)
*F02B 39/00* (2006.01)
*F04D 25/02* (2006.01)
*F02B 39/16* (2006.01)
*F01D 25/16* (2006.01)
*F04D 29/42* (2006.01)

(52) U.S. Cl.
CPC ...... *F01D 25/162* (2013.01); *F02B 2039/164* (2013.01); *F04D 29/4226* (2013.01); *F05D 2220/40* (2013.01); *F05D 2240/14* (2013.01); *F05D 2260/20* (2013.01)

(56) References Cited

U.S. PATENT DOCUMENTS

| | | | | |
|---|---|---|---|---|
| 4,147,467 | A * | 4/1979 | Leicht | F01D 25/14 415/196 |
| 6,553,762 | B2 * | 4/2003 | Loffler | F01D 9/026 415/203 |
| 8,365,526 | B2 * | 2/2013 | Stiermann | F01D 25/14 60/599 |
| 2012/0201655 | A1 * | 8/2012 | Kusakabe | F01D 9/026 415/116 |
| 2013/0323021 | A1 * | 12/2013 | Bogner | F01D 25/14 415/116 |
| 2015/0176429 | A1 * | 6/2015 | Oki | F01D 25/12 415/175 |
| 2018/0245481 | A1 * | 8/2018 | Hossbach | F01D 25/243 |

* cited by examiner

TURBOCHARGER

BACKGROUND OF THE INVENTION

1. Field of the Invention

The invention relates to a turbocharger.

2. Description of the Related Art

A turbocharger comprises a turbine for expanding a first medium, in particular for expanding exhaust gas, and a compressor for compressing a second medium, in particular charge air, utilizing the energy extracted in the turbine during the expansion of the first medium. The turbine comprises a turbine housing and a turbine rotor. The compressor comprises a compressor housing and a compressor rotor. The turbine rotor and compressor rotor are coupled via a shaft mounted in a bearing housing, the bearing housing being connected on the one side to the turbine housing and on the other side to the compressor housing.

The turbine housing of the turbine of the turbocharger comprises a turbine inflow housing, via which the medium to be expanded, in particular hot exhaust gas, can be supplied to the turbine rotor. The turbine housing is exposed to high thermal loads. A further problem of known turbine inflow housings relates to so-called containment safety. In particular when the turbine rotor breaks, fragments of the same can cause the turbine inflow housing to burst. This restricts the lifespan of the turbine inflow housing.

SUMMARY OF THE INVENTION

In view of the problems of the prior art, it is an object of the present invention to provide a new type of turbocharger, which, according to an aspect of the invention, includes a turbine inflow housing with a spiral-like construction, in one piece and double-walled, wherein between an outer wall of the turbine inflow housing and an inner wall of the turbine inflow housing a water duct for conducting cooling water is formed, and wherein the inner wall of the turbine inflow housing delimiting the water duct is directly followed by a guide duct of the first medium on a side of the inner wall facing away from the water duct. Upon cooling the spiral-like, one-piece and double-walled turbine inflow housing via the cooling water conducted through the water duct the thermal load of the turbine inflow housing is reduced. The one-piece and double-walled embodiment of the turbine inflow housing furthermore increases the containment safety of the same. Because of this, the lifespan of a turbine inflow housing as a whole can be prolonged.

According to a further development of the invention, a separating wall that circulates within the water duct seen in the circumferential direction, and extending between the outer wall and the inner wall, is formed, which is interrupted in the region of core hole bores introduced into the outer wall. The separating wall together with the outer wall and the inner wall, is an integral part of the spiral-like, one-piece and double-walled turbine inflow housing. The separating wall allows an unrestricted cooling of the turbine inflow housing via the cooling water. Furthermore, the separating wall increases the stiffness of the turbine inflow housing and the containment safety of the same.

Preferentially, the separating wall subdivides the water duct into two part ducts coupled to one another via core hole extending into the separating wall, wherein preferentially each of the core hole bores extending in the radial direction extends into the separating wall so that the separating wall is interrupted in the region of each of these core hole bores. These features also provide for easy and effective cooling of the turbine inflow housing and for simple and effective increase of containment safety. Because of this, the lifespan of the turbine inflow housing can be increased.

BRIEF DESCRIPTION OF THE DRAWINGS

Preferred further developments of the invention are obtained from claims and the following description. Exemplary embodiments of the invention are explained in more detail by way of the drawings without being restricted to this. In the drawings:

DETAILED DESCRIPTION OF THE PRESENTLY PREFERRED EMBODIMENTS

The invention relates to a turbocharger. A turbocharger comprises a turbine for expanding a first medium, in particular for expanding exhaust gas of an internal combustion engine. Furthermore, a turbocharger comprises a compressor for compressing a second medium, in particular charge air, namely utilizing energy extracted in the turbine during the expansion of the first medium. The turbine comprises a turbine housing and a turbine rotor. The compressor comprises a compressor housing and a compressor rotor. The compressor rotor is coupled to the turbine rotor via a shaft mounted in a bearing housing, wherein the bearing housing is positioned between the turbine housing and the compressor housing and is connected both to the turbine housing and the compressor housing. The person skilled in the art addressed here is familiar with this fundamental construction of a turbocharger.

Figure 1A:
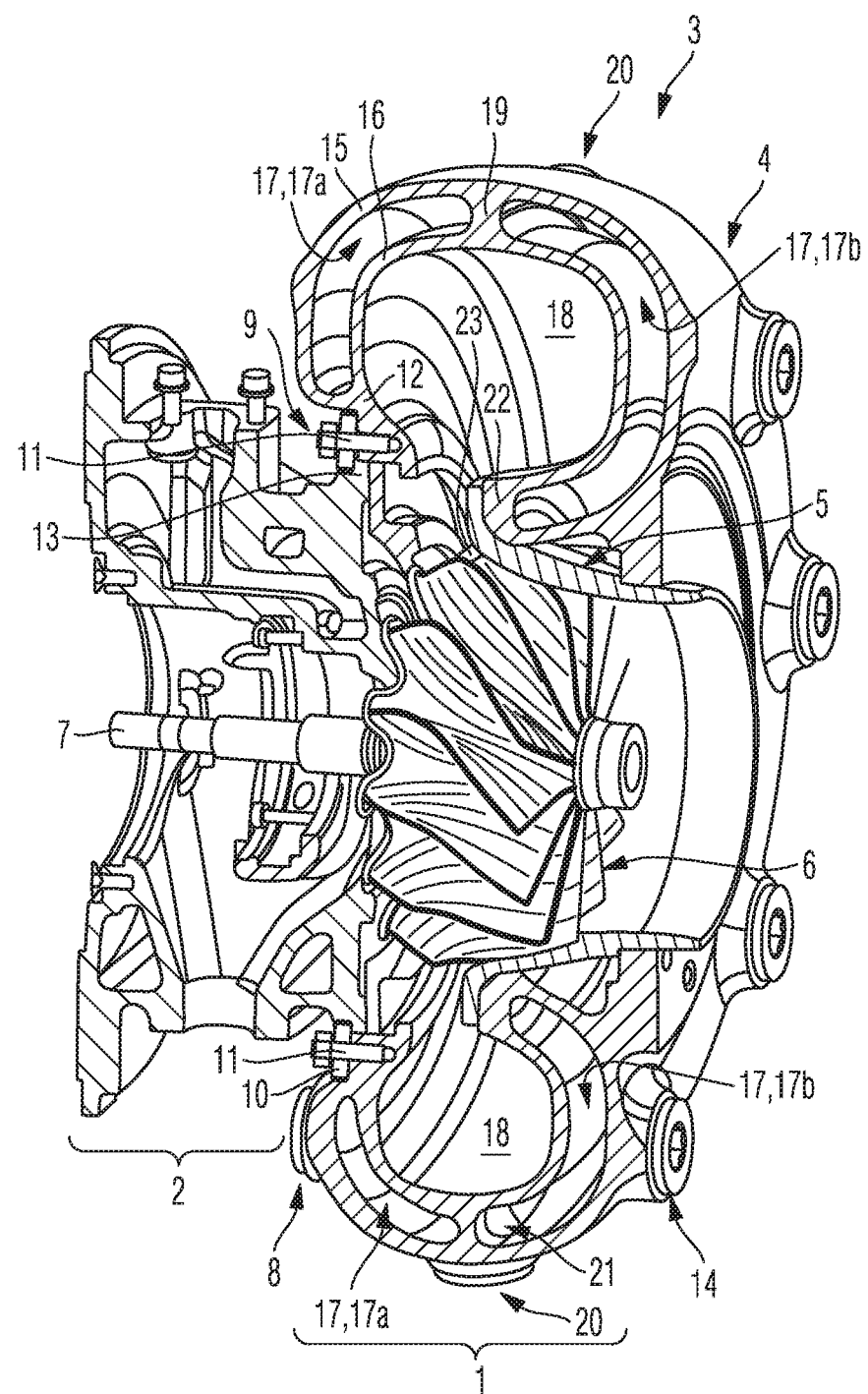
FIG. 1A: shows a cross section in the axial direction through a turbocharger according to the invention in the region of a turbine and of a bearing housing in the form of an extract.
Figure 1B:
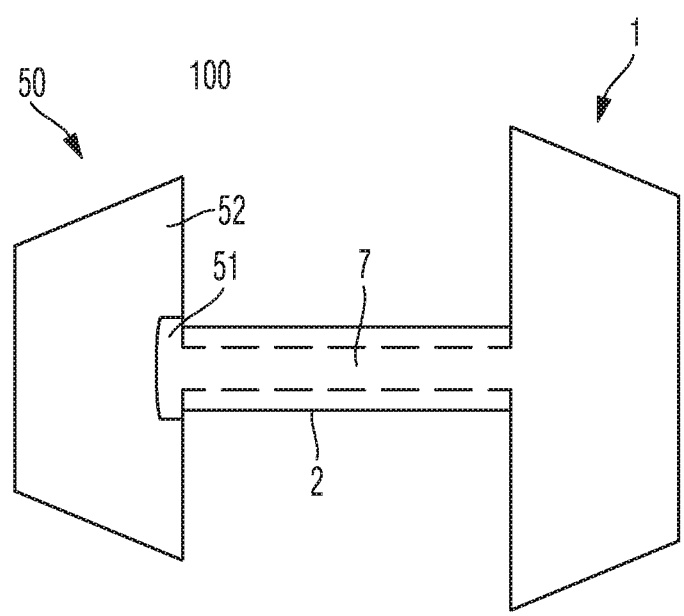
FIG. 1B: is a schematic diagram showing the turbocharger of the present invention.
Figure 2:
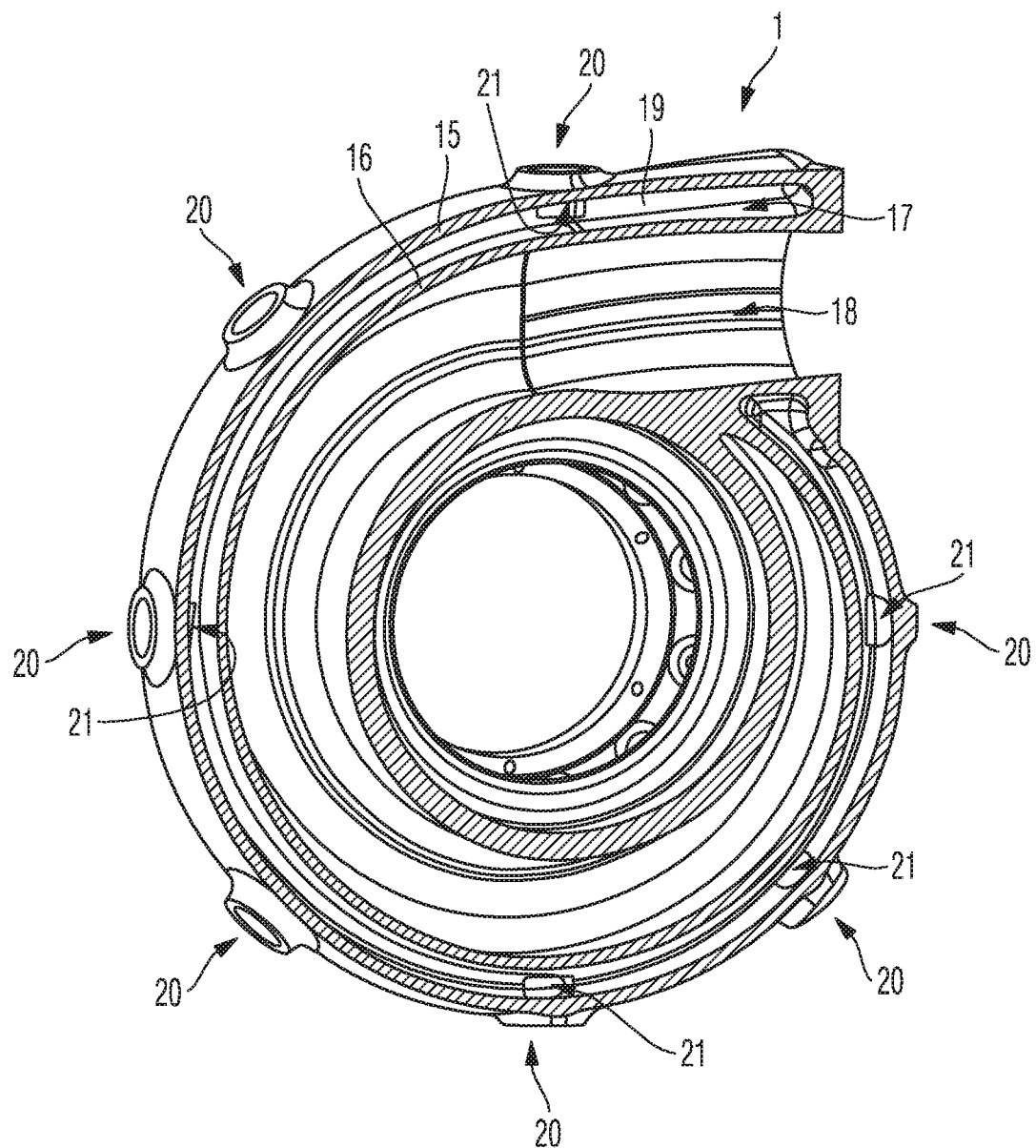
FIG. 2: shows a cross section in the radial direction through a turbine inflow housing of the turbine of FIG. 1A.

FIG. 1A shows a schematic cross section through a turbocharger in the region of a turbine 1 and of a bearing housing 2 in the form of an extract. The turbine 1 comprises a turbine housing 3, wherein the turbine housing 3 comprises a turbine inflow housing 4 and an insert piece 5. Furthermore, the turbine 1 comprises a turbine rotor 6. The turbine rotor 6 of the turbine 1 is coupled via a shaft 7 to a compressor rotor 51 of the compressor 50 of the turbocharger 100, shown schematically in FIG. 1B, wherein the shaft 7 is mounted in the bearing housing 2. The compressor 50 includes a compressor housing 52.

The turbine housing 3, in particular the turbine inflow housing 4, is connected, on a side 8, to the bearing housing 2 and specifically, in the shown exemplary embodiment, via a clamping claw connection 9, which comprises a clamping claw 10 and a plurality of fastening screws 11. On this axial side 8 of the turbine inflow housing 4, the clamping claw 10 covers a section 12 of the turbine inflow housing 4 and a section 13 of the bearing housing 2, wherein the fastening screws 11 extend through the clamping claw 10 into the section 12 of the bearing housing 4 and clamp the turbine inflow housing 4 and the bearing housing 2 together. On a side 14 of the turbine housing 3, located opposite the side 8, the insert piece 5 is positioned, which on this axial side protrudes relative to the turbine inflow housing 4 and discharges the first medium expanded in the region of the turbine rotor 6 from the turbine 1.

The turbine inflow housing 4 of the turbocharger according to the invention is designed in a spiral-like, one-piece and double-walled manner, in particular, in such a manner that between an outer wall 15 of the turbine inflow housing 4 and an inner wall 16 of the turbine inflow housing 4 a water duct 17 for cooling water is formed. This cooling water cools the turbine inflow housing. Accordingly, the water duct 17 is delimited radially outside by the outer wall 15 and radially inside by the inner wall 16 of the spiral-like, one-piece turbine inflow housing 4, wherein on a side of the inner wall 16 facing away from the water duct 17 a guide duct 18 of the turbine inflow housing 4 for the first medium yet to be expanded follows directly.

The water duct 17 reduces the thermal load of the turbine inflow housing 4 and, furthermore, the water duct 17 increases the containment safety of the housing 4. As a whole, the lifespan of the turbine inflow housing 4 can be increased.

In the illustrated preferred exemplary embodiment, a separating wall 19, circulating in the circumferential direction of the inflow housing 4 and extending between the outer wall 15 and the inner wall 16, is formed within the water duct 17, which is interrupted by core hole bores 20 introduced into the outer wall 15 of the turbine inflow housing 4 and in the radial direction forming recesses 21 in the separating wall 19. Here, the water duct 17 is subdivided via the separating wall 19 into two part ducts 17a, 17b, wherein these two part ducts 17a, 17b, in the region of the core hole bores 20, are coupled by the core hole bores 20 extending into the separating wall 19, which provide the apertures 21 in the region of the separating wall 19. Because of this, a transfer of the cooling water between the two part ducts 17a, 17b is made possible.

Seen in the circumferential direction, a plurality of such core hole bores 20, each extending in radial direction are distributed over the outer wall 15 of the turbine inflow housing 4, wherein each of the core hole bores 20 extending in the radial direction extends into the separating wall 19 so that in a plurality of circumferential positions, namely wherever core hole bores 20 are formed, a transfer of the cooling water between the part ducts 17a, 17b of the water duct 17 is possible.

As already explained, the turbine inflow housing 4 is embodied unitarily or monolithically, wherein the separating wall 19, together with the outer wall 15 and the inner wall 16, is an integral part of the one-piece or monolithic turbine inflow housing 4, which is preferentially produced by casting.

As already explained, the water duct 17 is subdivided, by the separating wall 19, into the two part ducts 17a, 17b, which are coupled via the apertures 21. Here, the part duct 17a extends in the direction of the axial side 8 and the part duct 17b in the region of the axial side 14 of the turbine inflow housing 4.

In the illustrated preferred exemplary embodiment of the invention it is provided that the part duct 17a radially inside in the region of the axial side 8 extends radially to the inside such that the part duct 17a, seen in the radial direction, is spaced from the section 12 of the turbine inflow housing 4, into which the fastening screws 11 of the clamping claw connection 9 extend. The part duct 17a running on the axial side 14 located opposite likewise extends radially to the inside namely such that the part duct 17b on the axial side 14 of the turbine inflow housing 4 seen in the radial direction extends as far as into a section 22 of the turbine inflow housing 4, against which a radially outer section 23 of the insert piece 5 comes to lie. Because of this, heat can also be effectively discharged from piece 5, namely from the section 23 that comes into contact with the first medium still to be expanded.

Accordingly, the invention relates to a turbocharger the turbine 1 of which is embodied as a radial turbine in the illustrated exemplary embodiment in which the turbine inflow housing 4 of the turbine housing 3 of the turbine 1 of the turbocharger is embodied as a radial turbine. As a result of the inventive structure, heat can be effectively discharged from the turbine inflow housing to reduce the thermal loading of that housing. Furthermore, the invention increases the containment safety as a whole, as well as the lifespan of the turbine inflow housing 4 and thus of the turbine 1.

Thus, while there have shown and described and pointed out fundamental novel features of the invention as applied to a preferred embodiment thereof, it will be understood that various omissions and substitutions and changes in the form and details of the device illustrated, and in its operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A turbocharger (100), comprising:
 a turbine (1) for expanding a first medium; and
 a compressor (50) for compressing a second medium utilizing energy extracted in the turbine (1) during the expansion of the first medium,
 wherein:
 the turbine (1) comprises a turbine housing (3) with a turbine inflow housing (4) and a turbine rotor (6),
 the compressor (50) comprises a compressor housing (52) and a compressor rotor (51) coupled to the turbine rotor (6) via a shaft (7),
 the turbine housing (3) and the compressor housing are each connected to a bearing housing (2), arranged between the turbine housing and the compressor housing, in which bearing housing (2) the shaft (7) is mounted,
 the turbine inflow housing (4) is constructed in a spiral-like, one-piece and double-walled manner, a water duct (17) for conducting cooling water is formed between an outer wall (15) of the turbine inflow housing (4) and an outer wall (16) of the turbine inflow housing (4), and the inner wall (16) of the turbine inflow housing (4) delimiting the water duct (17) is directly followed on a side of the inner wall (16) facing away from the water duct (17) by a guide duct (18) of the first medium to be expanded,
 the turbocharger (100) further comprising:
 a circumferential wall (19), extending in the water duct (17) between the outer wall (15) and the inner wall (16) so as to divide the water duct into a first part duct (17a) and a second part duct (17b), the circumferential wall

(19) having plural apertures (21) structured to facilitate a flow of the cooling water between the first and second part ducts (17a, 17b).

2. The turbocharger according to claim 1, wherein the turbine is a radial turbine.

3. A turbocharger (100), comprising:
a turbine (1) for expanding a first medium; and
a compressor (50) for compressing a second medium utilizing energy extracted in the turbine (1) during the expansion of the first medium,
wherein:
the turbine (1) comprises a turbine housing (3) with a turbine inflow housing (4) and a turbine rotor (6),
the compressor (50) comprises a compressor housing (52) and a compressor rotor (51) coupled to the turbine rotor (6) via a shaft (7),
the turbine housing (3) and the compressor housing are each connected to a bearing housing (2), arranged between the turbine housing and the compressor housing, in which bearing housing (2) the shaft (7) is mounted,
the turbine inflow housing (4) is constructed in a spiral-like, one-piece and double-walled manner, a water duct (17) for conducting cooling water is formed between an outer wall (15) of the turbine inflow housing (4) and an outer wall (16) of the turbine inflow housing (4), and the inner wall (16) of the turbine inflow housing (4) delimiting the water duct (17) is directly followed on a side of the inner wall (16) facing away from the water duct (17) by a guide duct (18) of the first medium to be expanded, and
within the water duct (17), in a circumferential direction, a circumferential separating wall (19), extending between the outer wall (15) and the inner wall (16), is arranged, the circumferential separating wall (19) being interrupted by core hole bores (20) introduced into the outer wall (15) and extending in a radial direction.

4. The turbocharger according to claim 3, wherein the separating wall (19) subdivides the water duct (17) into two part ducts (17a, 17b), which are coupled to one another via the core hole bores (20) extending into the separating wall (19).

5. The turbocharger according to claim 4, wherein each of the core hole bores (20) extending in the radial direction extends into the separating wall (19), so that the separating wall (19) is interrupted in the region of each of the core hole bores (20).

6. The turbocharger according to claim 3, wherein the spiral-like, one-piece and double-walled turbine inflow housing (4) comprises the separating wall (19), the outer wall (15) and the inner wall (16).

7. A turbocharger (100), comprising:
a turbine (1) for expanding a first medium; and
a compressor (50) for compressing a second medium utilizing energy extracted in the turbine (1) during the expansion of the first medium,
wherein:
the turbine (1) comprises a turbine housing (3) with a turbine inflow housing (4) and a turbine rotor (6),
the compressor (50) comprises a compressor housing (52) and a compressor rotor (51) coupled to the turbine rotor (6) via a shaft (7),
the turbine housing (3) and the compressor housing are each connected to a bearing housing (2), arranged between the turbine housing and the compressor housing, in which bearing housing (2) the shaft (7) is mounted,
the turbine inflow housing (4) is constructed in a spiral-like, one-piece and double-walled manner, a water duct (17) for conducting cooling water is formed between an outer wall (15) of the turbine inflow housing (4) and an outer wall (16) of the turbine inflow housing (4), and the inner wall (16) of the turbine inflow housing (4) delimiting the water duct (17) is directly followed on a side of the inner wall (16) facing away from the water duct (17) by a guide duct (18) of the first medium to be expanded, and
the turbine inflow housing (4) comprises, on a first axial side (8), a joint bearing housing (2) with a first section (12) and, on a second axial side (14), adjoins an insert piece (5) with a second section (22), wherein the water duct (17) on the first axial side (8) seen in radial direction ends spaced from the first section (12).

8. The turbocharger according to claim 7, wherein the water duct (17), on the second axial side (14), extends, as seen in radial direction, as far as into the second section (22).

* * * * *